United States Patent

Skalsey

[15] 3,654,797
[45] Apr. 11, 1972

[54] EXPANDING ARBOR FOR TAPERED HOLES

[72] Inventor: Lily G. Skalsey, Detroit, Mich.

[73] Assignee: Lear Siegler, Inc., Santa Monica, Calif.

[22] Filed: Mar. 5, 1970

[21] Appl. No.: 16,748

[52] U.S. Cl. .................................................. 72/393, 279/2
[51] Int. Cl. .................................................. B23b 31/40
[58] Field of Search .................... 269/48.1; 72/393, 398; 279/1 F, 2

[56] References Cited

UNITED STATES PATENTS

| 2,698,551 | 1/1955 | Olsen | 279/2 |
| 1,867,266 | 7/1932 | Johnson et al. | 279/2 |
| 2,941,735 | 6/1960 | Wyeth | 279/2 |
| 3,554,565 | 1/1971 | Cashman | 279/2 |

Primary Examiner—Lowell A. Larson
Attorney—Whittemore, Hulbert & Belknap

[57] ABSTRACT

An expanding arbor having at least two axially spaced sets of radially movable keys, wedge means for effecting positive outward movement of one set of keys, and resiliently urged wedge means for producing outward movement of the other set of keys to provide accurate centering irrespective of possible variations in diameter in an opening in which the arbor is engaged.

7 Claims, 1 Drawing Figure

PATENTED APR 11 1972 3,654,797
INVENTOR.
LILY G. SKALSEY
BY Whittemore,
Hulbert & Belknap
ATTORNEYS
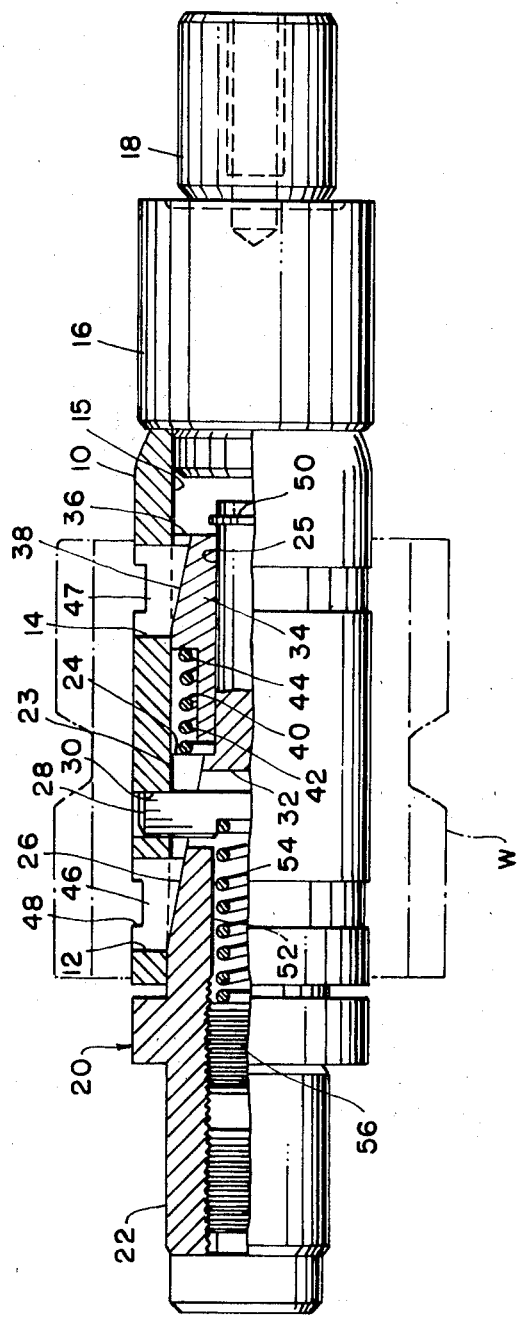

EXPANDING ARBOR FOR TAPERED HOLES

BRIEF SUMMARY OF THE INVENTION

It sometimes happens that in an elongated work piece having a through opening, the diameter of the opening may vary somewhat from end to end. In other cases the opening through the work piece may be deliberately tapered.

In accordance with the present invention such a work piece is supported on an arbor in accurately centered relation by at least two axially spaced sets of circumferentially arranged radially movable locating and driving keys.

One set of keys is contained in the arbor and is associated with a wedge construction adapted to be moved axially of the arbor when the ends of the arbor are moved towards each other. The other set of keys is associated with a floating wedge device which is spring urged in a direction to cause the keys to take up by uniform radial outward movement and so to locate the work piece. The wedge angle of the wedges in association with the keys is such that the keys are wedge locked against inward displacement by forces applied to the outer surfaces thereof from the work piece.

BRIEF DESCRIPTION OF THE DRAWING

The FIGURE is a side elevation, partly in section, of the expanding arbor.

DETAILED DESCRIPTION

Referring now to the drawing, the arbor comprises a generally tubular sleeve 10 having a circumferentially arranged set of openings 12 adjacent one end and a similar circumferentially arranged set of openings 14 adjacent the other end. The sleeve 10 has a cylindrical opening 15 extending from end to end thereof. The sleeve 10 is supported and engaged at its outer end by a body 16 having a reduced extension 18 adapted to be engaged in or by a head or tail stock of a machine tool.

Associated with the sleeve 10 and its support structure 16,18 is a mandrel 20 having a reduced outer end 22 for engagement in or by the other head or tail stock of the machine tool. The mandrel 20 includes a cylindrical portion 23 slidable in the cylindrical opening 15 of the sleeve and terminating in a radially facing shoulder 24 beyond which the mandrel comprises a reduced cylindrical end portion 25.

The enlarged cylindrical portion 23 of the mandrel is provided with a circumferentially spaced series of slots, the inclined bottom walls of which are indicated at 26. Each of these slots is in alignment with one of the openings 12 in the sleeve and the mandrel 20 and sleeve 10 are retained against circumferential displacement and relative axial movement is limited by means of a pin 28 received in an opening 30 formed in the sleeve and having its inner end extending into an elongated slot 32 provided in the mandrel 20.

Received on the reduced cylindrical end portion 25 of the mandrel 20 is a tubular cam member 34 having a cylindrical end 36 slidable in the bore or opening 15 of the mandrel. The enlarged cylindrical portion 36 is provided with a series of slots having bottom tapered walls 38 each of which is in alignment with one of the openings 14.

The inner end of the cam member 34 is reduced as indicated at 40 and a compression spring 42 surrounds the reduced portion 40 and is engaged between the shoulder 24 on the mandrel and a shoulder 44 on the cam member.

Keys 46 and 47 are received in the openings 12 and 14 respectively and have inclined inner edges engageable with the inclined bottom walls 26 and 38 of the slots. The keys are recessed as indicated at 48 to receive garter springs or the like which retain the keys against radial outward movement.

It will be appreciated that the keys 47 in the openings 14 retain the cam member 34 with its slots in alignment with the openings 14. A snap ring 50 is received on the inner end of the mandrel 20.

Located in a central opening 52 in the mandrel 20 is a compression spring 54 which is retained in assembly by plug means 56 closing the outer end of the mandrel.

With the parts as described, it will be apparent that a work piece such as an elongated gear indicated in dot and dash lines at W in the Figure, may receive the expanding arbor with the two sets of keys 46 and 47 loosely received within the bore of the work piece and retained in innermost position by means of the garter springs (not shown).

Initially, the spring 42 retains the cam member 34 against the snap ring 50 while spring 54 holds sleeve 10 forwardly on the mandrel in the limiting position determined by engagement between pins 28 and the end of slot 32. Movement of the mandrel 20 toward body 18, after sleeve 10 has engaged the body 16, moves the mandrel inwardly of the sleeve, and spring 42 retains the cam 34 against snap ring 50 until keys 47 are cammed outwardly into engagement with the bore of the work W. At this time no further outward movement of the keys is permitted and continued movement of the mandrel causes snap ring 50 to move away from the keys, which are thus urged outwardly by the action of spring 42 of cam member 34.

Further advance of the mandrel 20 relative both to sleeve 10 and cam member 34 causes cam surfaces 26 to cam keys 46 outwardly until they engage solidly with the bore of the work W, at which time further advance of the mandrel 20 is prevented. During this last advance of the mandrel, its reduced cylindrical portion of course slides through cam member 34.

Accordingly, the mandrel may be used in association with a work piece having a central bore which is not exactly cylindrical, while at the same time it may be positively supported against radial movement and in accurate axial alignment with the arbor. The wedge surfaces at the inner end of the keys 47 and the associated wedge surfaces 38 at the bottoms of the slots in the cam member 34 are at a locking angle so that radial forces applied to the work piece and through the work piece to the keys 47 are ineffective to displace the keys from their accurate locating position.

It will be observed that the clearance between the snap ring 50 and the adjacent end of the cam member 34 is such that upon movement of the mandrel 20 outwardly of the sleeve 10, the ring 50 will engage the end of the camming member and thus prevent further movement thereof axially relative to the mandrel as the mandrel is moved further relative to the sleeve. Accordingly, the cam surfaces 38 of the cam member 34 are moved relative to the openings 14 so that the keys 47 may be moved inwardly.

It will be observed that the cam member 34 includes the cylindrical portion 36 which is interrupted by the slots having the inclined bottom walls 38 so that the cam member may be considered as slidable axially on the reduced cylindrical portion 25 of the mandrel, or as slidable axially within the cylindrical bore or opening 15 of the sleeve 10. Similarly, it will be observed that the resilient means 42 which is illustrated in the Figure as engaged at one end by the shoulder 24 of the mandrel, could of course seat against means affixed to the sleeve, as for example the pin 28, so that the cam member 34 is biased to the right as seen in the Figure by resilient means acting between the mandrel or the sleeve and the cam member.

What I claim as my invention is:

1. An expanding arbor comprising a sleeve having two axially spaced sets of circumferentially spaced radial openings, a mandrel in said sleeve, a first set of cam surfaces on said mandrel in alignment with the openings in one set of openings in said sleeve, a cam member slidable axially in said sleeve relative to said mandrel, said cam member having a second set of cam surfaces in alignment with the openings in the other set of openings, keys in said openings engaging the associated cam surfaces, first resilient means within said sleeve and acting on said cam member to urge said cam member in a direction to cam the associated keys outwardly, and first stop means acting between said sleeve and mandrel for providing limited axial movement therebetween.

2. An arbor as defined in claim 1 comprising second resilient means acting between said sleeve and mandrel urging said members in a direction to permit radial inward displacement of the keys in said one set of openings.

3. An arbor as defined in claim 2 comprising second stop means acting between said mandrel and cam member positioned to engage prior to engagement of said first stop means upon movement of said mandrel outwardly of said sleeve.

4. An arbor as defined in claim 3 comprising resilient means engaging all of said keys and urging them radially inwardly but having an effectiveness permitting radial outward displacement thereof on movement of said mandrel into said sleeve.

5. An arbor as defined in claim 3, said sleeve having a cylindrical opening therein, said mandrel having a first cylindrical portion slidable within said opening and having axially extending slots the bottom walls of which form said first set of cam surfaces.

6. An arbor as defined in claim 5, said mandrel having a second reduced cylindrical portion on which said cam member is axially slidable, said cam member having a first cylindrical portion slidable within said opening, said first cylindrical portion of said cam member having axially extending slots the bottom walls of which form said second set of cam surfaces.

7. An arbor as defined in claim 6, said cam member having a reduced end portion adjacent the first cylindrical portion of said mandrel, said first resilient means surrounding said reduced end portion and acting between said mandrel and cam member.

* * * * *